United States Patent [19]

Idel

[11] 4,112,789
[45] Sep. 12, 1978

[54] MACHINE FOR WORKING SAW TEETH

[76] Inventor: Vladimir Viktorovich Idel, selo Kolchino, ulitsa Kirova, 11, Zakarpatskaya oblast, Mukachevsky raion, U.S.S.R.

[21] Appl. No.: 781,016

[22] Filed: Mar. 24, 1977

[30] Foreign Application Priority Data

Mar. 30, 1976 [SU] U.S.S.R. .............................. 2333521
Mar. 30, 1976 [SU] U.S.S.R. .............................. 2333524

[51] Int. Cl.$^2$ ............................................ B23D 63/04
[52] U.S. Cl. ................................................. 76/58
[58] Field of Search ............... 76/58, 59, 63, 62, 61, 76/66, 68, 71, 75, 77, 37, 43, 112

[56] References Cited

U.S. PATENT DOCUMENTS

| 3,630,103 | 12/1971 | Idel | 76/58 |
|---|---|---|---|
| 3,657,946 | 4/1972 | Idel | 76/112 |
| 3,661,037 | 5/1972 | Athanasoulas | 76/58 |

FOREIGN PATENT DOCUMENTS 776,946  11/1934  France .......................... 76/59

Primary Examiner—Al Lawrence Smith
Assistant Examiner—Roscoe V. Parker
Attorney, Agent, or Firm—Robert E. Burns; Emmanuel J. Lobato; Bruce L. Adams

[57] ABSTRACT

A machine for working band saw teeth, the bed of which machine mounts an abrasive wheel for grinding saw teeth and a clamping device for holding the saw on the side and back surfaces thereof, which clamping device mounts a mechanism for effecting reciprocating movement thereof relative to the abrasive wheel, said mechanism being kinematically connected with a machine driving mechanism and a saw pitch-feed mechanism, and at least two tooth tip supporting elements one of which is located before the abrasive wheel, as viewed in the direction of pitch feed, and the other is located thereafter and has at least two shaped surfaces arranged to make contact with the tips of the saw teeth, said other supporting element being mounted on the clamping device so as to be able to be moved relative thereto for the purpose of positioning the shaped surfaces so that the side surfaces of the saw tooth tips make contact therewith during pitch feed, whereby the setting of the tooth tips is performed.

25 Claims, 21 Drawing Figures

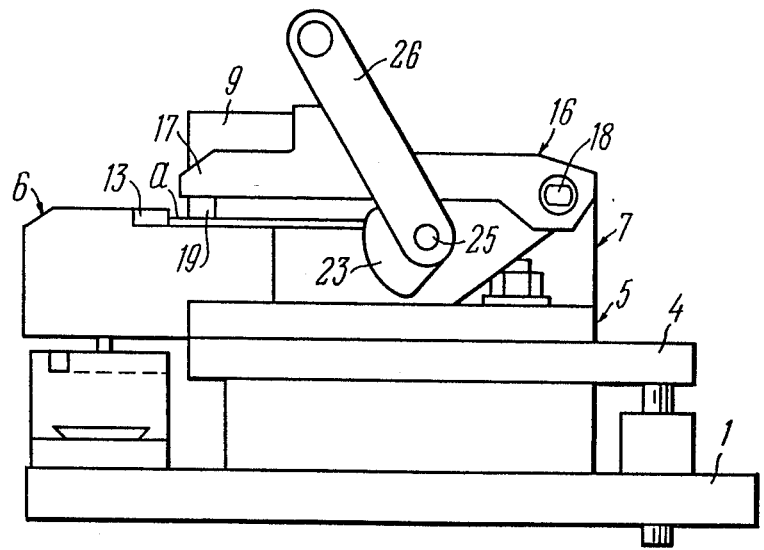
FIG. 3
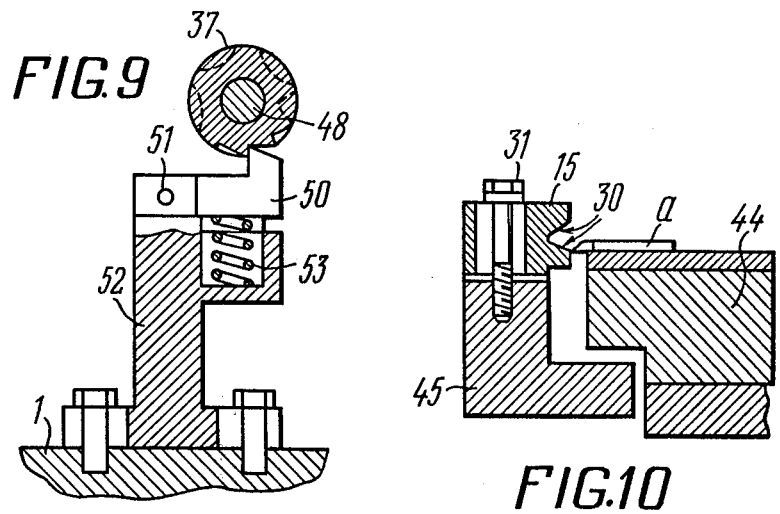
FIG. 9
FIG. 10

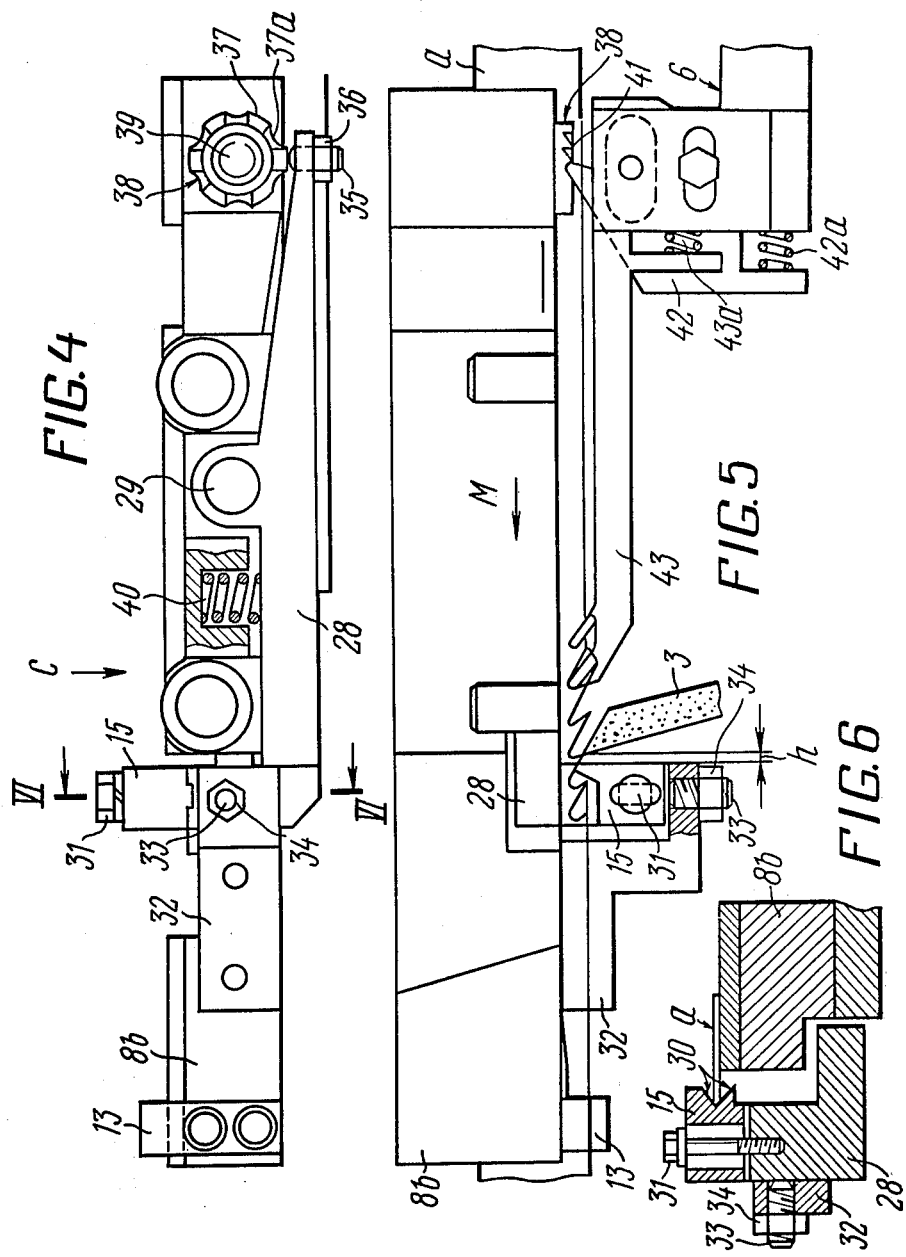

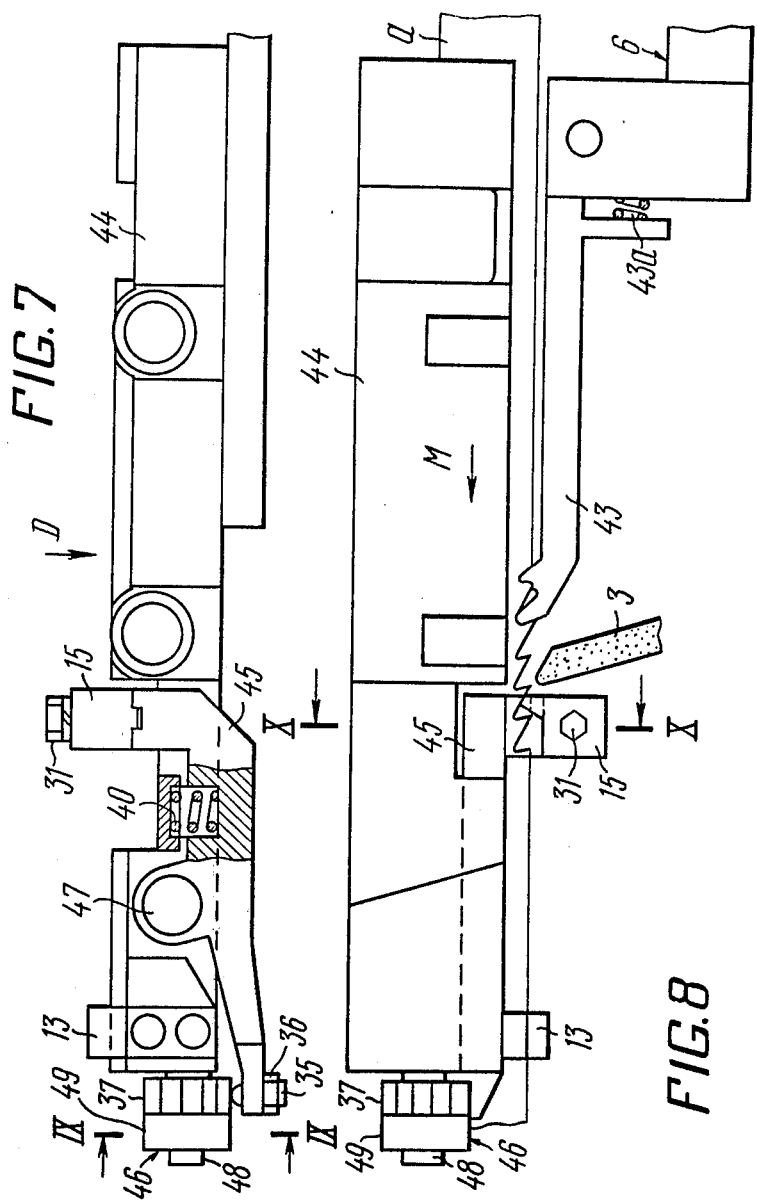

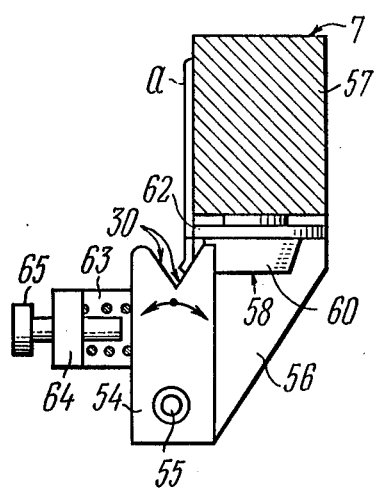
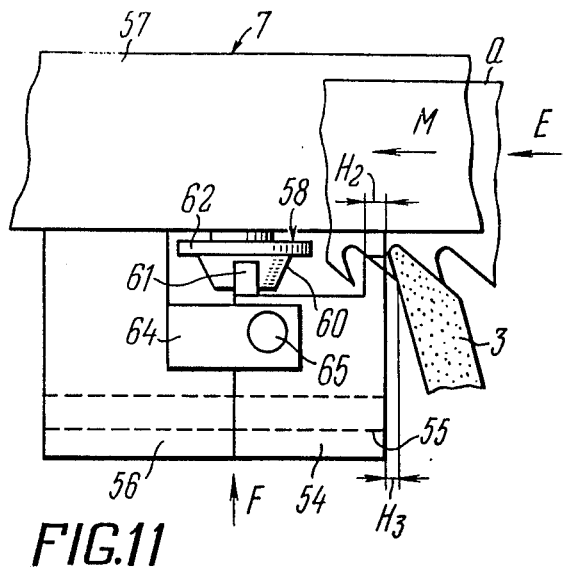
FIG.12    FIG.11
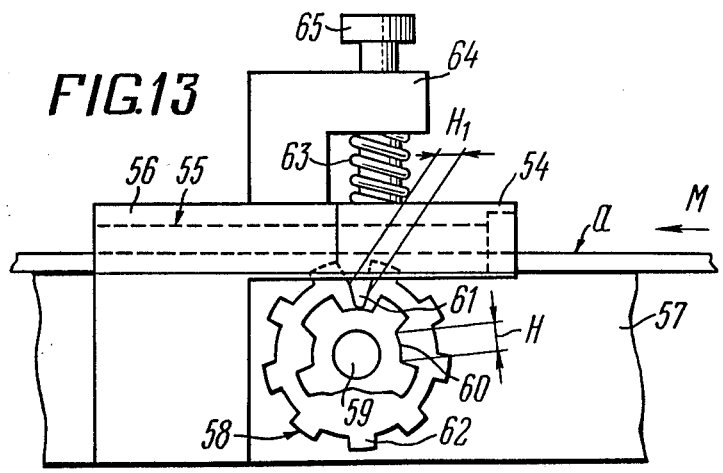
FIG.13

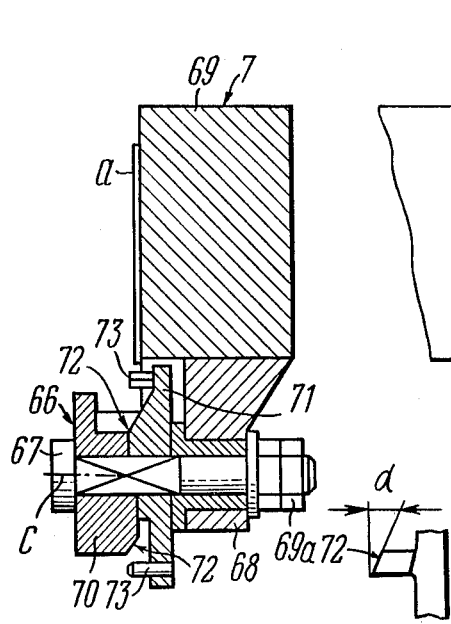
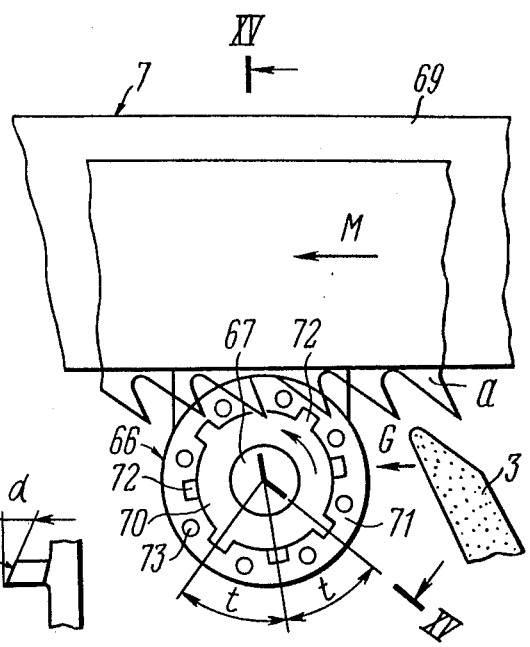
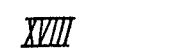
FIG.15　　FIG.16　　FIG.14
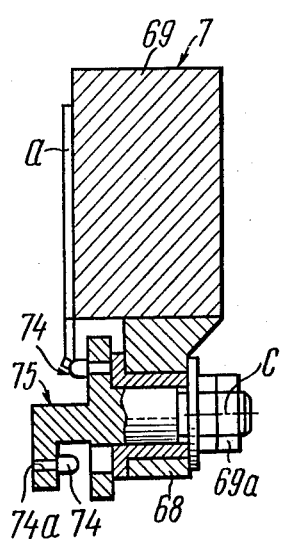
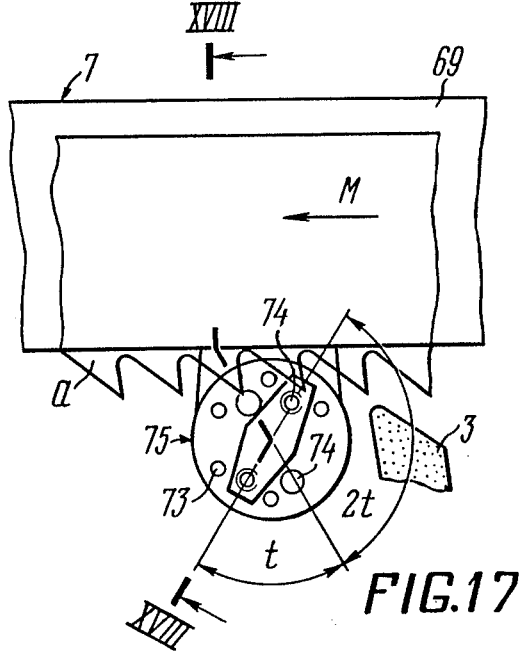
FIG.18　　FIG.17

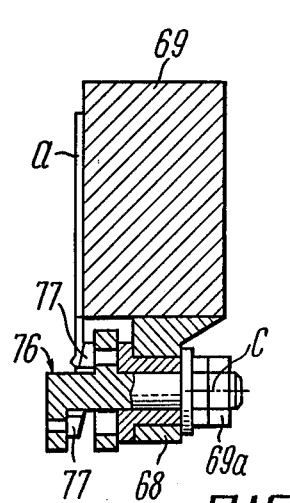
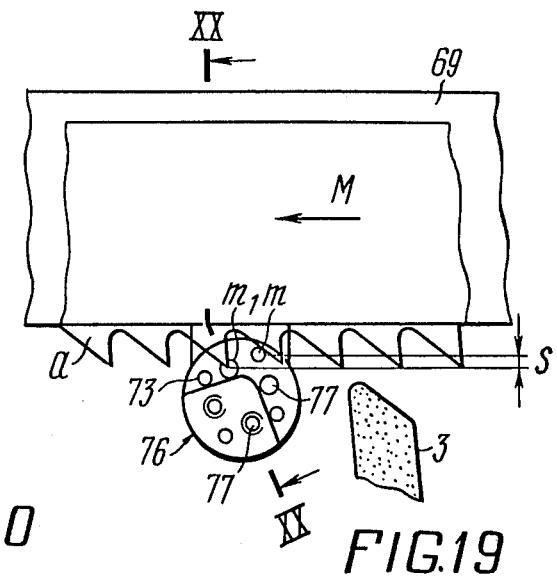
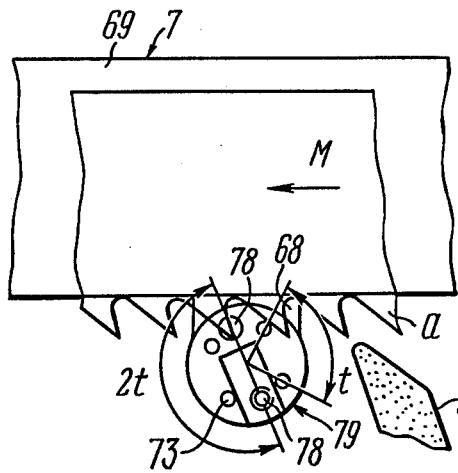

4,112,789

MACHINE FOR WORKING SAW TEETH

FIELD OF APPLICATION

The present invention has reference to improvements in or relating to methods of working saw teeth and machines for carrying same into effect.

The method and the machine constituting the present invention can be used to advantage for working the teeth of band saws.

Known in the art is a method of sharpening band saw teeth whereby the saw is fed to an abrasive wheel in order to grind the edges of the saw teeth. During the grinding process the edges of the tooth being sharpened are heated to a temperature approximating to the melting point of the saw material, whereby hardening of the saw tooth is effected. Thereafter the saw is imparted a pitch-feed movement in order to bring the next tooth to the grinding wheel for the purpose of sharpening the tooth edges.

Also known in the art are machines for working saw teeth, which machines comprise a bed mounting a clamping device arranged to hold the saw on the side and back surfaces thereof and carrying tooth tip supporting elements. The bed of the machine also mounts a pitch-feed mechanism and a mechanism carrying a tool for setting the saw teeth, said mechanisms being kinematically connected with the driving mechanism of the machine. The tooth tip supporting elements are located one before the tooth setting tool, as viewed in the direction of pitch feed, and the other thereafter.

The same bed mounts a mechanism which carries an abrasive wheel designed to sharpen saw teeth and a clamping device designed to hold the saw on the back and side surfaces thereof and having tooth tip supporting elements.

Installed on the clamping device is a mechanism arranged to reciprocate the clamping device together with the saw relative to the abrasive wheel for the purpose of sharpening the saw teeth, said mechanism being kinematically connected with the drive mechanism of the machine and the pitch-feed mechanism. The tooth tip supporting elements are located one before the abrasive wheel, as viewed in the direction of pitch feed, and the other thereafter. Said other supporting element is rigidly secured to the clamping device and has two shaped surfaces positioned at an angle to each other.

BACKGROUND OF THE INVENTION

With the machine described above, the setting and sharpening of the saw teeth are effected by the use of independent equipment mounted on the common bed and spaced thereabout, which renders the machine somewhat unwieldy and calls for setting up both the sharpening and the tooth setting equipment in service.

Furthermore, the employment of independent tooth sharpening and setting equipment increases the cost of the machine.

On the machines described above saw teeth are set at one-half or full height thereof, which shortens saw service life because of a comparatively mall tooth rigidity.

OBJECTS OF THE INVENTION AND BRIEF DESCRIPTION THEREOF

It is an object of the present invention to provide a method of working saw teeth and a machine for carrying same into effect whereby the sharpening and setting of saw teeth can be performed practically at the same time and by the use of the same equipment, the setting of saw teeth being performed only in the zone of tooth tips.

It is a further object of the present invention to simplify the construction of the machine.

It is a still further object of the present invention to reduce the cost of the machine.

It is a still further object of the present invention to provide for hardening of saw tooth tips simultaneously with sharpening and setting thereof.

It is a still further object of the present invention to lengthen the service life of saws produced by the use of the machine constituting the invention.

These and other objects are achieved by providing a method of working saw teeth whereby the saw involved is fed to an abrasive wheel for the purpose of grinding the edges of the saw teeth, the surface layer of the edges of each tooth is heated during the grinding process to a temperature approximating to the melting point of the saw material, and the saw is subsequently imparted a pitch-feed movement relative to the abrasive wheel. According to the invention, each tooth tip heated in the grinding process to a temperature slightly above that of hot brittleness is bent during pitch feed by bringing the side surface of the tooth tip in contact with the appropriate shaped surface of the tooth tip supporting element, whereby the setting of the saw teeth is performed only in the zone of the tips.

According to the invention, the machine for carrying into effect said method of working saw teeth comprises a bed which mounts an abrasive wheel for grinding saw teeth and a clamping device for holding the saw on the side and back surfaces thereof, which clamping device mounts a mechanism for effecting reciprocating movement thereof relative to the abrasive wheel, said mechanism being kinematically connected with the driving mechanism of the machine and a saw pitch-feed mechanism, and at least two tooth tip supporting elements one of which is located before the abrasive wheel, as viewed in the direction of pitch feed, and the other is located thereafter and has at least two shaped surfaces arranged to make contact with the tips of the saw teeth, said other supporting element being mounted on the clamping device so as to be able to be moved relative thereto for the purpose of positioning the shaped surfaces so that the side surfaces of the saw tooth tips make contact with the appropriate shaped surfaces of the other supporting element during pitch feed, whereby the saw teeth are set, the setting being performed only in the zone of the tooth tips.

It is desirable that said other supporting element should have two shaped surfaces disposed opposite each other and be mounted on one arm of a lever pivoted on a shaft positioned perpendicular to the direction of pitch feed and secured to the clamping device, the other arm of said lever being in constant contact with shaped portions of a follower installed on the clamping device and connected kinematically with the driving mechanism of the machine.

By mounting said other supporting element in the manner described above provision is made for the machine to work saws of various tooth pitches.

The lever arm carrying said other supporting element may be spring-loaded in the direction of the pivotal movement thereof in order to provide sure contact between the follower and the other arm of the lever.

It is further desirable that the follower be rotatably mounted on the clamping device, the axis of follower rotation being perpendicular to the direction of pitch feed, the shaped portions be located on the follower side surface and equidistantly spaced round the circumference, and teeth be provided on the follower face, said teeth forming a ratchet wheel arranged to engage with a pawl mounted on the pitch-feed mechanism.

The constructional arrangement of the follower and the kinematic connection thereof with the pitch-feed mechanism is most compact.

It may also be desirable that the follower be rotatably mounted on the clamping device, the axis of follower rotation being parallel to the direction of pitch feed, the shaped portions be located on the follower side surface and equidistantly spaced round the circumference, and in the proximity thereto a ratchet wheel be provided, said ratchet wheel being arranged for engagement with a pawl during the feed motion of the saw toward the abrasive wheel, said pawl being mounted on the bed of the machine.

This constructional arrangement simplifies the setting-up of the machine in service.

It is still further desirable that said other supporting element have two shaped surfaces disposed opposite each other and be mounted on a shaft located parallel to the direction of pitch feed and secured to the clamping device, and that for rotation thereof provision be made of a follower mounted on the clamping device in proximity to said other supporting element and having shaped portions located on the side surface thereof and equidistantly spaced round the circumference, said shaped portions being in constant contact with a projection provided on said other supporting element, the follower also having gear teeth arranged to be in constant mesh with the saw teeth during the pitch-feed movement of the saw.

This arrangement of said other supporting element may be advantageous on saw working machines intended for mass production.

It is still further desirable that the length of each shaped portion of the follower be somewhat greater than the total width of the projection provided on said other supporting element and than the width of the shaped surface of said other supporting element.

This dimensional relationship between the follower and said other supporting element makes it possible to place said other supporting element in the initial position during the pitch-feed movement of the saw and to effect the setting of the saw teeth.

The projection of said other supporting element and the shaped surfaces thereof may be spaced in the direction opposite to saw pitch feed so that the shaped surfaces stand beyond the priphery of the follower gear.

This constructional arrangement of said other supporting element provides for locating it at the minimum possible distance from the abrasive wheel.

It is still further desirable that the follower part having shaped portions be made in the form of a frustum of a cone.

This constructional arrangement enables abrasive particles to run off the follower.

It is still further desirable that said other supporting element be spring-loaded in order to keep the projection thereof in constant contact with the shaped portions of the follower.

It is still further desirable that, in order to restrict the angle of rotation of said other supporting element, a stop be provided on the clamping device, said stop being adjustably mounted thereon.

It is still further desirable that said other supporting element be mounted rotatably, the axis of rotation thereof being perpendicular to the direction of pitch feed, and the shaped surfaces of said supporting element be disposed circumferentially in opposite planes, the shaped surfaces lying in one plane being offset in relation to the shaped surfaces lying in the other plane by a predetermined amount according to the style of the saw tooth setting involved, the rotation of said other supporting element being effected by provision of projections arranged to mesh with the saw teeth, said projections being equidistantly spaced round the circumference of said supporting element and arranged to alternate with the shaped surfaces in accordance with the style of the saw tooth setting involved.

This constructional arrangement of said other supporting element provides substantial decrease in the tooth setting effort and may be advantageous on machines intended for mass production.

It is still further desirable that each shaped surface be inclined in the direction from the axis of rotation of said other supporting element to the periphery thereof.

This constructional arrangement provides the required tooth setting geometry.

It is possible that each shaped surface be inclined in the direction of rotation of said other supporting element.

This constructional arrangement enables the saw teeth to readily get onto the shaped surface during the setting process.

It is further desirable that each shaped surface be essentially of curved shaped.

It is still further desirable that the projections be of cylindrical shape.

It is possible that each shaped surface be formed on a cylindrical part removably mounted on said other supporting element.

This construction of the shaped surfaces and projections is most suitable from the manufacturing viewpoint.

Said other supporting element may be made in two parts, the division plane thereof being perpendicular to the axis of rotation.

The construction of the supporting element is advantageous from the manufacturing viewpoint and simplifies replacement of worn parts in service.

It is still further desirable that the shaped surfaces of said other supporting element disposed in opposite planes be alternately located between the projections at a constant pitch equal to the pitch of the projections, being positioned nearer to the axis of rotation than the projections.

Said other supporting element constructed in this manner is intended for consecutive setting of saw teeth.

It is still further desirable that the shaped surfaces of said other supporting element disposed in opposite planes be alternately located between the projections at a varying pitch with a ratio of 1:2 and somewhat nearer to the axis of rotation than the projections.

Said other supporting element constructed in this manner is intended for setting every two teeth at one-tooth intervals.

It is still further desirable that the shaped surfaces of said other supporting element disposed in opposite planes be alternately located in pairs between the projections at a constant pitch and somewhat nearer to the axis of rotation than the projections.

Said other supporting element constructed in this manner is intended for setting saw teeth in alternate pairs.

It is still further desirable that the shaped surfaces of said other supporting element be located nearer to the axis of rotation than the projections by the amount equal to the distance between the point of contact of the projection with the saw tooth and the point of contact of the tooth tip side surface with the shaped surface.

This constructional arrangement of said other supporting element enables the side surface of the tooth tip to freely come into contact with the shaped surface of the supporting element when the latter is turned through the pitch.

It is possible that the shaped surfaces of said other supporting element disposed in opposite planes be located alternately with the projections round the same circumference at a pitch equal to two pitches of said projections.

This constructional arrangement provides for setting every other tooth.

The method of working saw teeth in accordance with the present invention provides for sharpening saw teeth practically along with setting and hardening, the setting of teeth being performed in the zone of tooth tips.

The machine for carrying this method into effect is compact due to the fact that the setting of saw teeth is performed by the use of the same clamping device which is employed for tooth sharpening and can be comparatively simply adapted for tooth sharpening along with setting and hardening, the setting of teeth being made in the zone of tooth tips.

The saws produced by the method constituting the present invention have a considerably longer service life than the saws known in the prior art and the teeth thereof need no setting in service practically until their cutting edges become fully blunt. The saw teeth set by this method practically cannot be bent to the opposite side. The saws produced by this method work with a considerably smaller cutting effort.

BRIEF DESCRIPTION OF DRAWINGS

Now the invention will be described in detail with reference to the accompanying drawings in which:

FIG. 3 is a view in the direction of the arrow A of FIG. 1, rotated 90°.

FIG. 4 is a view in the direction of the arrow B of FIG. 1, showing the guide in the housing of the clamping device and the lever with said other supporting element.

FIG. 5 is a view in the direction of the arrow C of FIG. 4.

FIG. 6 is a sectional view on the line VI—VI of FIG. 4, rotated 90°.

FIG. 7 shows an embodiment of mounting said other supporting element on the clamping device.

FIG. 8 is a view in the direction of the arrow D of FIG. 7.

FIG. 9 is a sectional view on the line IX—IX of FIG. 7.

FIG. 10 is a sectional view on the line X—X of FIG. 8, rotated 90°.

FIG. 11 is a plan view showing the third embodiment of mounting said other supporting element on the clamping device.

FIG. 12 is a view in the direction of the arrow E of FIG. 11.

FIG. 13 is an enlarged view in the direction of the arrow F of FIG. 11.

FIG. 14 is a plan view showing said other supporting element and the mounting thereof on the clamping device.

FIG. 15 is a sectional view on the line XV—XV of FIG. 14.

FIG. 16 is a view in the direction of the arrow G of FIG. 14.

FIG. 17 is a plan view showing an embodiment of said other supporting element.

FIG. 18 is a sectional view on the line XVIII—XVIII of FIG. 17.

FIG. 19 is a plan view showing an embodiment of said other supporting element.

FIG. 20 is a sectional view on the line XX—XX of FIG. 19.

FIG. 21 is a plan view showing an embodiment of said other supporting element.

DETAILED DESCRIPTION OF THE INVENTION AND EMBODIMENTS THEREOF

Figure 1:
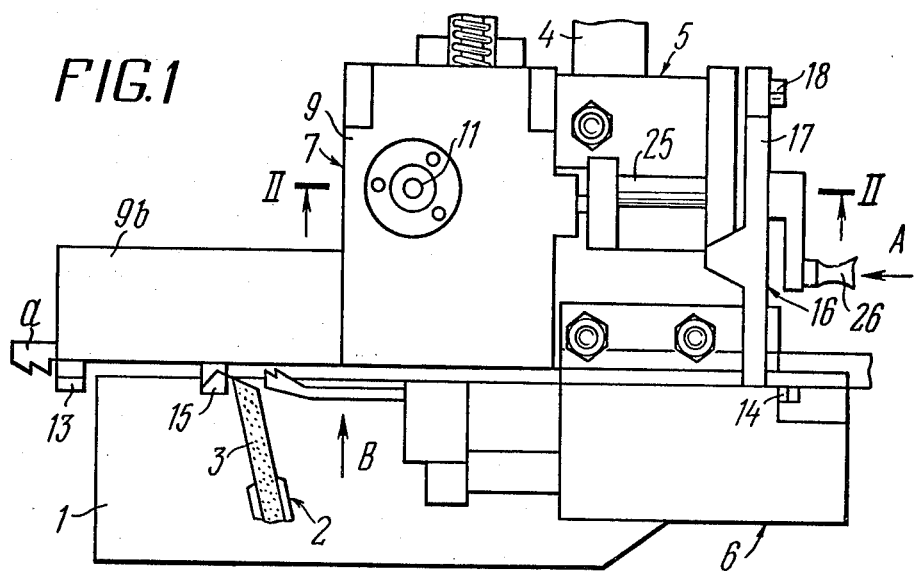
FIG. 1 is a plan view of the machine for working band saw teeth.

The present invention provides a method of working saw teeth whereby the saw involved is fed to an abrasive wheel for the purpose of grinding the edges of the saw teeth and the surface layer of the edges of each tooth being ground is heated in the course of the grinding process to a temperature approximating to the melting point of the saw material. Then, during pitch-feed movement of the saw the tip of each tooth, after the latter has been ground and heated to hot brittleness, is bent by bringing the side surface of the tooth tip in contact with the appropriate shaped surface of the tooth tip supporting element.

Although the term "hot brittleness" is understandable to those conversant with the art, it will be explained herein so as to avoid misunderstanding. Hot brittleness is understood to mean herein susceptibility of steel to cracking in the process of hot working in the temperature range of red and yellow heat (850°–1150° C.).

The method constituting the present invention will be covered in further detail in the description of the operation of the machine for carrying this method into effect.

The machine for working the teeth of band saws "a" (FIG. 1) comprises a bed 1 which mounts a sharpening mechanism 2 with an abrasive wheel 3, a carriage 4 which mounts a mechanism 5 for feeding the saw "a" to the abrasive wheel 3 for the purpose of sharpening the edges of adjacent saw teeth, and a mechanism 6 for imparting the saw "a" a pitch-feed movement relative to the abrasive wheel 3 after the edges of adjacent teeth have been sharpened thereby. The feed mechanisms 5 and 6 are kinematically interconnected for the purpose of correlating the movement of the saw "a" to the abrasive wheel 3 and the pitch-feed movement of the same relative to said abrasive wheel.

Mounted on the carriage 4 is a clamping device 7 designed to hold the saw on the side and back surfaces thereof. The clamping device 7 has a housing 8 (FIG. 2) with a cover 9. The housing 8 and the cover 9 are articulated to each other and loaded by a spring 10 one end of which is secured in the housing 8 and the other is attached to the cover 9 by means of an adjusting screw 11.

The flat surfaces of the housing 8 and the cover 9 located opposite each other form guides 8b (FIG. 4) and 9b (FIG. 1) for the saw "a," said guides supporting the saw on the side surfaces thereof.

The guides may also be constructed in the form of rollers mounted in pairs in the housing and the cover, opposite each other.

Mounted in the same housing 8 (FIG. 2) is a device 12 for holding the saw on the back side thereof.

The clamping device 7 mounts three tooth tip supporting elements 13 (FIG. 1), 14 and 15.

The supporting element 13 is mounted on the guide 8b (FIG. 4) of the housing 8. The supporting element 14 (FIG. 1) is mounted on the housing of the mechanism 6 installed on the clamping device 7. The supporting element 13 is located some distance from the abrasive wheel 3. Said supporting elements are designed for the tips of the saw teeth to bear thereon in succession.

The supporting element 13 is located after the abrasive wheel 3, as viewed in the direction of pitch feed, and has a surface parallel to the tooth tips.

Mounted on the carriage 4 some distance from the clamping device 7 is a device 16 (FIGS. 2 and 3) for braking the saw "a." This device comprises a lever 17 whose shaft 18 (FIGS. 3, 1) is mounted on the carriage 4. Attached to the end of the lever 17 is a pressure element 19 (FIG. 3) resiliently forced against the side surface of the saw "a" by provision of a spring 20 (FIG. 2) acting on the lever 17. One end of the spring 20 is connected to the carriage 4 by the use of a bolt 21, the other end of the spring 20 is connected to the lever 17 through an adjusting bolt 22.

For the cover 9 and the lever 17 to be turned simultaneously when placing the saw in the guides 8b (FIG. 4) and 9b (FIG. 1), the lever 17 and the cover 9 are arranged to interact respectively with eccentrics 23 (FIG. 2) and 24 mounted on a shaft 25. One end of the shaft 25 mounts a handle 26 and the other end mounts a nut 27 which locates the device 12 for holding the saw "a" on the back side thereof.

Figure 2:
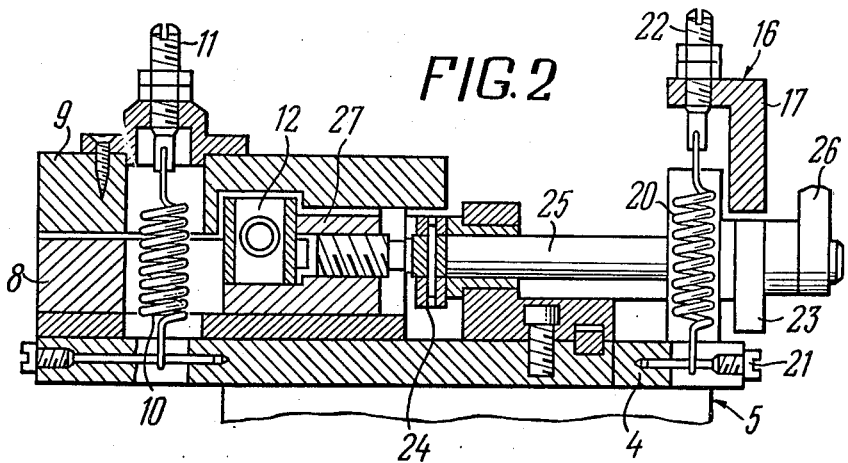
FIG. 2 is an enlarged view on the line II—II of FIG. 1.

A lever 28 (FIGS. 4, 5, 6) is mounted on the guide 8b (FIGS. 4, 5, 6) for the housing 8 (FIG. 2). The lever 28 is installed on a shaft 29 (FIG. 4) secured in the housing 8 (FIG. 2) and located perpendicular to the direction of saw pitch feed indicated by the arrow M in FIG. 5.

On one arm of the lever 28 is mounted the other supporting element 15 constructed in the form of a vee block with shaped surfaces 30 (FIG. 6) located opposite each other. The supporting element 15 is attached to the lever 28 by means of a bolt 31. To prevent the lever 28 from bending during the tooth setting process, the arm of the lever 28 which carries the support element 15 is held by a bracket 32 mounted on the housing 8 (FIG. 2). Installed in the bracket 32 (FIGS. 4, 5) is an adjusting screw 33 with a nut 34, which screw serves for the purpose of taking up play by clamping the lever 28. On the other arm of the lever 28 is installed an adjusting bolt 35 (FIG. 4) with a nut 36, which screw is arranged to be in constant contact with shaped portions 37 and 37a of a follower 38. The shaped portions 37 are made in the form of projections, whereas the shaped portions 37a are of concave form. The follower 38 is mounted on a shaft 39 installed in the guide 8b. The lever 28 is held in constant contact with the shaped portions 37 and 37a of the follower 38 by virtue of a spring 40 which is provided in the guide 8b and constantly acts on the arm of the lever 28 which is remote from the follower 38. The shaft 39 is parallel to the shaft 29 of the the lever 28. The shaped portions 37 and 37a are formed on the side surface of the follower 38, being alternately and equidistantly spaced round the circumference. On the face of follower 38 are provided teeth which form a ratchet wheel 41 arranged to engage with a pawl 42 mounted on the housing of the pitch-feed mechanism 6. On the same housing is mounted a pawl 43 which is arranged to interact with the teeth of the saw "a" in order to impart it a pitch-feed movement. The pawls 42 and 43 are acted upon by springs 42a and 43a respectively. The arm of the lever 28 which mounts the other supporting element 15 is loaded by the spring 40 (FIG. 4) in the direction of its pivotal movement.

In another embodiment of the invention, a lever 45 (FIGS. 7, 8, 9) is mounted on the housing 44 (FIGS. 7, 8, 10) of the clamping device 7 (FIG. 1). One arm of the lever 45 mounts the supporting element 15, whereas the other arm thereof is in constant contact, through the bolt 35 with the nut 36, with the shaped portions 37 of a follower 46, which shaped portions are essentially similar to those described above. The lever 45 is mounted on a shaft 47 (FIG. 7) installed on the housing 44 perpendicular to the direction of pitch feed. The follower 46 is mounted on a shaft 48 located parallel to the direction M of pitch feed. The shaped portions 37 are formed on the side surface of the follower and equidistantly spaced round the circumference thereof. In the immediate proximity to the shaped portions 37 on the side surface of the follower 46 is formed a ratchet wheel 49 arranged to engage with a pawl 50 (FIG. 9) mounted on a shaft 51 secured to a housing 52 which is installed on the bed 1. The pawl 50 is loaded by a spring 53 in the direction of its pivotal movement. The lever 45 (FIG. 7) is loaded by the spring 40 in the direction of its pivotal movement. The constructional arrangement wherein the pawl 50 (FIG. 9) is mounted on the bed 1 simplifies the setting-up of the machine inasmuch as the position of the pawl 50 is not affected by changes in the position of the pawl 43 (FIG. 8) incorporated in the pitch-feed mechanism.

In a further embodiment of the invention, the other supporting element 54 (FIGS. 11, 12) has two shaped surfaces 30 (FIG. 12) disposed at an angle to each other and is mounted on a shaft 55 which is located parallel to the direction M of pitch feed and secured in a bracket 56. The bracket 56 is rigidly secured to the housing 57 of the clamping device 7. For the purpose of installing the supporting element 54 in the initial position before performing tooth setting, provision is made of a follower 58 mounted on a shaft 59 (FIG. 13) which is secured to the housing 57 near the other supporting element 54. The shaft 59 is perpendicular to the direction M of pitch feed. Shaped portions 60 are provided on the side surface of the follower 58. In this embodiment, all the shaped portions are formed on the conical side surface of the follower 58 inasmuch as the conical surface provides against retention of abrasive particles. The shaped portions 60 are essentially similar to those described above, i.e., they are equidistantly spaced round the circumference and projections alternate with concave portions. The shaped portions 60 are in constant contact with a projection 61 (FIGS. 11, 13) provided on the supporting element 54.

In the immediate proximity to the shaped portions 60 on the side surface of the follower 58, nearer the clamping device 7, are provided the teeth of a gear 62, the ate proximity to the tooth tip, for example, at a distance equal to the layer of stock to be removed plus 1 mm.

Further, the pawl 43 is orientated so that during the feeding movement of the mechanism 6 the pawl 42 turns the follower 38 clockwise through one pitch.

Thereafter, the abrasive wheel 3 is orientated so that it is opposite the space between the adjacent teeth of the saw "a," in the immediate proximity to the other supporting element 15. Adjustment is made for the other supporting element 15 to move so that in the course of the pitch feed movement the tips of the saw teeth come into contact with the shaped surfaces 30 of the other supporting element 15 and become bent alternately to opposite sides by the same amount.

After the setting-up of the machine is completed, the drive is put in operation. The front edge of the saw tooth involved comes into contact with the abrasive wheel 3, a substantially high pressure being exerted on the front edge of the tooth due to comparatively large removal of stock (0.3–1 mm) and increased duration of contact between the abrasive wheel 3 and the front edge of the tooth. Under these conditions the surface layer of the saw metal becomes heated to a temperature approximating to the melting point of the saw material. In consequence, the heat concentrates on the tooth tip, the latter becoming heated to a depth of 1–3 mm.

At the instant the front edge of the saw tooth gets out of contact with the abrasive wheel 3 pitch feed of the saw is started. In the course of the pitch-feed movement the side surface of the heated tooth tip strikes against the shaped surface 30 of the other supporting element 15 and thereby becomes bent by the predetermined amount, the tip of the tooth assuming a trapezoidal form. During the pitch-feed movement the tooth tip cools rapidly due to air current produced by the abrasive wheel 3 whereby hardening of the tooth tip is effected. After the setting of the tip of the first tooth has been performed, the second tooth is set to the opposite side by coming into contact with the other shaped surface 30 of the other supporting element 15 in the course of pitch feed. Thereafter the process is repeated in the same sequence.

To ensure high quality of the tooth setting operation, the tooth tip is brought into contact with the shaped surface 30 of the other supporting element 15 before the temperature in the zone of the tooth bend drops below the critical value necessary for setting the tooth tips without formation of microcracks in the zone of the bend, i.e., provision is to be made against hot brittleness of the saw material. For example, when sharpening a carbon steel saw with a 10 mm tooth pitch, the distance between the supporting element 15 and the front edge of the tooth being 2–4 mm, the time period between the completion of sharpening the front edge of the tooth and the commencement of the contact of the tooth tip side surface with the shaped surface 30 of the other supporting element 15 must not exceed 0.005–0.02 second, which corresponds with a sharpening rate of 400 teeth/minute to 600 teeth/minute.

With the tooth setting method described above, only the tooth tip portion within 1 mm is bent, the width of the cutting edge being decreased. These conditions provide exceptional rigidly of the set teeth. Owing to the decrease in the width of the tooth cutting edge and to the fact that the bent tooth tip is very small (within 1 mm), the cutting forces during saw operation are reduced sharply inasmuch as the length of the tooth cutting surface is decreased materially. Furthermore, the small heating of the saw teeth and the "hot" setting thereof practically eliminate residual deformation in the setting process, whereby high accuracy of the setting job is ensured.

Tests have shown that the best results in the setting of tooth tips are obtained at sharpening rates of 400 teeth/minute above.

The appropriate shaped surface 30 of the other supporting element is placed in the initial position as follows:

During the pitch-feed movement of the saw pawl 42 comes into engagement with the teeth of the ratchet wheel 41 and turns the follower 38 so that the bolt 35 comes into contact with the projecting shaped portion 37.

The lever 28 turns on the shaft 29 and places one shaped surface 30 of the other supporting element 15 in the initial position for setting the first tooth of the saw "a" to one side. During the subsequent pitch-feed movement of the saw "a" the bolt 35 comes into contact with the concave shaped portion 37a. The lever 28 turns and places the opposite shaped surface 30 of the other supporting element 15 in the initial position for setting the second tooth of the saw "a" to the opposite side. Then the tooth setting process is repeated.

The machine with the lever 45 shown in FIGS. 7 and 8 operates substantially as described above. The appropriate shaped surfaces 30 of the other supporting element 15 are placed in the initial position during the feed of the saw "a" to the abrasive wheel 3, i.e., as the clamping device 7 moves to the abrasive wheel 3, the pawl 50 engages the ratchet wheel 49 of the follower 46 and turns the latter.

The shaped surfaces 30 of the other supporting element 54 (FIGS. 11 to 13) are placed in the initial position before setting the saw teeth as follows:

In the course of the pitch-feed movement of the saw "a" the tooth thereof engages the tooth of the gear 62 and turns the latter through one pitch, whereby the follower 58 is also turned through one pitch. Inasmuch as the projection 61 is in constant contact with the shaped portions 60 of the follower 58, one or the other shaped surface 30 is placed in the initial position, depending on whether the projection 61 of the other supporting element 54 makes contact with the projecting or the concave shaped portion 60. The saw teeth alternately come into contact with the shaped surfaces 30 and are set to the opposite sides by the same amount.

The embodiments of the other supporting element shown in FIGS. 15 to 21 operate, in the main, in a manner similar to that described for the appropriate styles of tooth setting.

Practically, any sequence of set and unset teeth can be obtained.

What is claimed is:

1. A machine for working band saw teeth, comprising: a bed; an abrasive wheel for sharpening band saw teeth, said abrasive wheel being mounted on said bed; means for rotating said abrasive wheel; a clamping device for holding the band saw involved on the side and back surfaces thereof, said clamping device being mounted on the bed and arranged to reciprocate for the purpose of feeding said band saw to the abrasive wheel; a driving mechanism of the machine; a mechanism for effecting reciprocating movement of said clamping device, said mechanism being kinematically connected with said driving mechanism of the machine; a band saw pitch-feed mechanism mounted on said clamping device number of said teeth being equal to the number of the shaped portions 60. The teeth of said gear are in constant mesh with the teeth of the saw "a." In the course of pitch feed, the saw "a" turns the gear 62 through an angle corresponding with one pitch of the saw teeth.

The length H (FIG. 13) of each shaped portion 60 is chosen so that it is somewhat greater than the total width $H_1$ of the projection 61 and the width $H_2$ (FIG. 11) of the shaped surface 30 (FIG. 12) of the other supporting element 54.

The other supporting element 54 is constructed so that its projection 61 and the shaped surfaces 30 are spaced in the direction opposite to that of pitch feed by a distance which provides for installing the follower 58 so that the periphery of its gear 62 stands beyond the shaped surfaces 30 as shown in FIG. 11. Owing to the spaced positions of the projection 61 and the shaped surfaces 30, the abrasive wheel 3 can be located at the minimum possible distance from the shaped surfaces 30 of the supporting element 54.

The projection 61 of the other supporting element 54 is held in constant contact with the shaped portions 60 by provision of a spring 63 (FIGS. 12, 13) which is mounted between the other supporting element 54 and a part 64 secured to the bracket 56.

A stop 65 designed to restrict the angle of rotation of the other supporting element 54 is adjustably mounted in the part 64. In this embodiment, the stop 65 is constructed in the form of a screw.

In a still further embodiment of the invention, the other supporting element 66 (FIGS. 14, 15) is located in the immediate proximity to the abrasive wheel 3 in the direction M of pitch feed and mounted on a shaft 67 which is installed on a bracket 68 (FIG. 15). The bracket 68 is rigidly secured to the housing 69 of the clamping device 7. The shaft 67 is installed in the bracket 68 perpendicular to the direction M of pitch feed. The shaft 67 is constructed in the form of a bolt which is held in the bracket 68 by a nut 69.

The other supporting element 66 is of divided construction and consists of two parts, 70 and 71, which are rigidly secured on the shaft 67, the division plane of said parts being perpendicular to the shaft 67.

The parts 70 and 71 of the other supporting element 66 are essentially disks the adjacent faces of which are provided with shaped surfaces 72 equidistantly spaced round the circumference at the pitch "t" (FIG. 14). The shaped surfaces 72 of the part 70 are offset by one pitch relative to the shaped surfaces 72 of the part 71.

Projections 73 are secured to the part 71, being located equidistantly round the circumference thereof and somewhat farther from the axis C of rotation of the supporting element 66 than the shaped surfaces 72. The projections 73 are arranged to mesh with the saw teeth for the purpose of rotating the other supporting element 66 in the course of saw pitch-feed movement. The projections 73 alternate with the shaped surfaces 72. Therefore, when the other supporting element 66 is turned through one pitch, the shaped surfaces 72 successively take the initial position for setting the saw teeth by bending them alternately to the opposite sides.

Each shaped surface 72 is inclined in the direction from the axis C of rotation of the other supporting element 66 to the periphery thereof, being inclined at the angle α (FIG. 16) in the direction of rotation of said supporting element.

In this embodiment, the projections 73 are of cylindrical form and are secured to the part 71 of the other supporting element 66. This form of the projections is most suitable from the manufacturing viewpoint.

The projections may be made in other forms suitable for the purpose.

To provide for setting every two teeth at one-tooth interval, i.e, for the setting style wherein one tooth is bent to one side, the next to the opposite side, the third tooth is left unbent, and so on, shaped surfaces 74 (FIGS. 17, 18) disposed in opposite planes of the other supporting element 75 are alternately located at the varying pitch "t" and "2t." Each surface 74 is of curved shape as shown in FIG. 18.

This surface is formed on a part 74a (FIG. 18) which has a cylindrical portion for the attachment thereof to the other supporting element 75.

The shaped surfaces 74 are located somewhat nearer to the axis C of rotation of the other supporting element 75 than the projections 73.

To provide for setting saw teeth in alternate pairs, i.e., for the setting style wherein two teeth are bent to one side and the next two teeth are bent to the opposite side, and so on, shaped surfaces 77 disposed in opposite planes of the other supporting element 76 (FIGS. 19, 20) are alternately located in pairs between the projections 73 at a constant pitch and somewhat nearer to the axis C of rotation of the other supporting element 76. Referring to FIGS. 19 and 20, each shaped surface 77 is formed on a cylindrical part removably mounted on the other supporting element 76. The shaped surfaces 77 are inclined from the axis C of rotation of the other supporting element 76 to the periphery thereof and are located nearer to the axis C than the projections 73 meshing with the teeth of the saw "a."

The shaped surfaces in any of the herein described embodiments of the other supporting element 75, 76 may be of both inclined and curved form.

The shaped surfaces 72, 74 and 77 are spaced from the respective projections 73 by the amount S (FIG. 19) equal to the distance between the point "m" of contact of the projection 73 with the saw tooth and the point "$m_1$" of contact of the tooth tip side surface with the respective shaped surface 72, 74, 77.

To provide for setting every other tooth, i.e., for the setting style wherein one tooth is bent to one side, the second is left unbent, the third is bent to the opposite side, the fourth is left unbent, and so on, shaped surfaces 78 (FIG. 21) disposed in opposite planes of the other supporting element 79 are located alternately with the projections 73 round the same circumference at the pitch 2t equal to two pitches "t" of the projections 73.

The machine for sharpening band saw teeth operates as follows:

First the machine is set up. For the purpose the shaft 25 and the eccentrics 23 and 24 attached thereto are turned by turning the handle 26 clockwise. The eccentrics raise the cover 9 and the lever 17, thereby extending the springs 10 and 20. The saw "a" is placed on the guide 8b of the housing 8. Thereafter the handle 26 is turned counter-clockwise and the springs 10 and 20, by contraction thereof, lower the cover 9 and the lever 17 with the pressure element 19 onto the side surface of the saw "a." At the same time the device 12 is locked by means of the nut 27. After the saw is secured in the clamping device 7, it is orientated in relation to the shaped surfaces 30 of the other supporting element 15 so that upon completion of the pitch-feed movement the end of the other supporting element 15 is in the immediand kinematically connected with said driving mechanism of the machine; at least two tooth tip supporting elements, one of them being located before said abrasive wheel, as viewed in the direction of pitch feed, and the other supporting element being mounted on said clamping device after said abrasive wheel, as viewed in the direction of pitch feed; at least two shaped surfaces formed on said other supporting element and arranged to make contact with the tips of the saw teeth, said other supporting element being mounted on said clamping device so as to be able to be moved relative thereto for the purpose of positioning said shaped surfaces so that the side surfaces of the tooth tips make contact with the appropriate shaped surfaces, whereby the saw teeth are set, the setting being performed only in the zone of the tooth tips.

2. A machine as claimed in claim 1, wherein said other supporting element has at least two shaped surfaces disposed opposite each other and is mounted on one arm of a lever pivoted on a shaft positioned perpendicular to the direction of pitch feed and secured to the clamping device, the other arm of said lever being in constant contact with shaped portions of a follower installed on the clamping device and connected kinematically with the driving mechanism of the machine.

3. A machine as claimed in claim 2, wherein the lever arm carrying said other supporting element is spring-loaded in the direction of the pivotal movement thereof.

4. A machine as claimed in claim 2, wherein the follower is rotatably mounted on the clamping device, the axis of follower rotation being perpendicular to the direction of pitch feed, the shaped portions are located on the follower side surface and equidistantly spaced round the circumference, and teeth are provided on the follower face, said teeth forming a ratchet wheel arranged to engage with a pawl mounted on the pitch-feed mechanism.

5. A machine as claimed in claim 2, wherein the folower is rotatably mounted on the clamping device, the axis of follower rotation being parallel to the direction of pitch feed, the shaped portions are located on the follower side surface and equidistantly spaced round the circumference, and in the proximity thereto a ratchet wheel is provided, said ratchet wheel being arranged for engagement with a pawl during the feed motion of the saw toward the abrasive wheel, said pawl being mounted on the bed of the machine.

6. A machine as claimed in claim 1, wherein said other supporting element has two shaped surfaces disposed opposite each other and mounted on a shaft located parallel to the direction of pitch feed and secured to the clamping device, and for rotation thereof provision is made of a follower mounted on the clamping device in proximity to said other supporting element and having shaped portions located on the side surface thereof and equidistantly spaced round the circumference, said shaped portions being in constant contact with a projection provided on said other supporting element, the follower also having gear teeth arranged to be in constant mesh with the saw teeth.

7. A machine as claimed in claim 6, wherein the length of each shaped portion of the follower is somewhat greater than the total width of the projection provided on said other supporting element and than the width of the shaped surface of said other supporting element.

8. A machine as claimed in claim 6, wherein the projection of said other supporting element and the shaped surfaces thereof are spaced in the direction opposite to saw pitch feed so that the shaped surfaces stand beyond the periphery of the follower gear.

9. A machine as claimed in claim 6, wherein the folower part having shaped portions is made in the form of a frustum of a cone.

10. A machine as claimed in claim 6, wherein said other supporting element is spring-loaded in order to keep the projection thereof in constant contact with the shaped portions of the follower.

11. A machine as claimed in claim 6 wherein, in order to restrict the angle of rotation of said other supporting element, a stop is provided on the clamping device, said stop being adjustably mounted thereon.

12. A machine as claimed in claim 1, wherein said other supporting element is mounted rotatably, the axis of rotation thereof being perpendicular to the direction of pitch feed, and the shaped surfaces of said supporting element are disposed circumferentially in opposite planes, the shaped surfaces lying in one plane being offset in relation to the shaped surfaces lying in the other plane by a predetermined amount according to the style of the saw tooth setting involved, the rotation of said other supporting element being effected by provision of projections arranged to mesh with the saw teeth, said projections being equidistantly spaced round the circumference of said supporting element and arranged to alternate with the shaped surfaces in accordance with the style of the saw tooth setting involved.

13. A machine as claimed in claim 12, wherein each shaped surface is inclined in the direction from the axis of rotation of said other supporting element to the periphery thereof.

14. A machine as claimed in claim 13, wherein each shaped surface is inclined in the direction of rotation of said other supporting element.

15. A machine as claimed in claim 12, wherein each shaped surface is essentially of curved shape.

16. A machine as claimed in claim 12, wherein the projections are of cylindrical shape.

17. A machine as claimed in claim 12, wherein each shaped surface is formed on a cylindrical part removably mounted on said other supporting element.

18. A machine as claimed in claim 12, wherein said other supporting element is made in two parts, the division plane thereof being perpendicular to the axis of rotation.

19. A machine as claimed in claim 12, wherein the shaped surfaces of said other supporting element disposed in opposite planes are alternately located between the projections at a constant pitch equal to the pitch of the projections, being positioned nearer to the axis of rotation than the projections.

20. A machine as claimed in claim 12, wherein the shaped surfaces of said other supporting element disposed in opposite planes are alternately located between the projections at a varying pitch with a ratio of 1:2 and somewhat nearer to the axis of rotation than the projections.

21. A machine as claimed in claim 12, wherein the shaped surfaces of said other supporting element disposed in opposite planes are alternately located in pairs between the projections at a constant pitch and somewhat nearer to the axis of rotation than the projections.

22. A machine as claimed in claim 19, wherein the shaped surfaces of said other supporting element are located nearer to the axis of rotation than the projections by the amount equal to the distance between the point of contact of the projection with the saw tooth and the point of contact of the tooth tip side surface with the shaped surface of said other supporting element.

23. A machine as claimed in claim 20, wherein the shaped surfaces of said other supporting element are located nearer to the axis of rotation than the projections by the amount equal to the distance between the point of contact of the projection with the saw tooth and the point of contact of the tooth tip side surface with the shaped surface of said other supporting element.

24. A machine as claimed in claim 21, wherein the shaped surfaces of said other supporting element are located nearer to the axis of rotation than the projections by the amount equal to the distance between the point of contact of the projection with the saw tooth and the point of contact of the tooth tip side surface with the shaped surface of said other supporting element.

25. A machine as claimed in claim 12, wherein the shaped surfaces of said other supporting element disposed in opposite planes are located alternately with the projections round the same circumference at a pitch equal to two pitches of said projections.

* * * * *